UNITED STATES PATENT OFFICE 1,958,373

MANUFACTURE OF BLOWN OILS

Alexander Schwarcman, Buffalo, N. Y., assignor to Spencer Kellogg and Sons, Inc., Buffalo, N. Y., a corporation of New York No Drawing. Application May 28, 1932, Serial No. 614,287

3 Claims. (Cl. 87—12)

This invention relates to the manufacture of blown oils; and it comprises air-blown drying oils having a high specific gravity, the specific gravity being approximately unity; it also comprises processes of making such air-blown oils and solutions of the same, wherein a drying oil is air-blown at suitable temperatures until the oil has a specific gravity of approximately 1.0 and then the hot oxidized oil thus obtained is mixed with a volatile solvent, before solidification, thus producing a solution of the high gravity blown oil, which is an excellent coating composition either with or without added ingredients; and it further comprises such solutions and such coating compositions, all of which give rapid drying films and coatings; all as more fully hereinafter set forth and as claimed.

Many ways are known of preparing drying oils, such as linseed oil, preparatory to paint and varnish making; the treatment varying according to the purposes for which the oil is used. Among these ways is the old and well known process of oxidizing linseed oil by air blowing. Air blowing may be done at any temperature between 300 and 170° F. oil temperature. The oxidized oil has many well known advantages when used in paint and varnish, but it has also some recognized disadvantages. When linseed oil is oxidized by air blowing, the specific gravity increases, but as the specific gravity increases, the solubility in various solvents decreases until, in the higher stages of oxidation, the oil is practically insoluble in most of the solvents ordinarily used in making and thinning paints and varnishes. Among the recognized disadvantages of blown oil is a certain lack of miscibility with mineral oils; this being more pronounced the further the oxidation goes. This is inconvenient for various reasons; among them being the growing use, as thinners of turpentine substitutes prepared from petroleum oils.

I have found that in the usual processes of air blowing drying oils, the oxidation should be stopped when a specific gravity of 0.996 is obtained. Otherwise the blown oil will not have sufficient miscibility with mineral oils, such as turpentine substitutes. In the air blowing of drying oils, the ordinary practice is to limit the oxidation to the production of a blown oil having a specific gravity slightly above 0.990 and not exceeding 0.996, thereby ensuring that the blown oil shall have sufficient solubility in the various solvents used in paints and varnishes. When the upper limit is exceeded, difficulty is encountered in making varnishes and paints, and these latter, when they can be made, are not sufficiently stable; they do not meet commercial requirements.

In prior and copending applications, Serial Nos. 599,367, 599,368 and 614,052, I have described processes for producing blown oils and blown oil compositions, superior to the blown oils of the older art and free from the disadvantages inherent therein. In the processes of the present invention I depart from those of these prior applications, producing different products. These products may have a specific gravity of approximately 1.0 while retaining a good miscibility. The blown oil may be effectively used in coating compositions and the above mentioned disadvantages obviated.

In the process of the present invention drying oils are air-blown at suitable temperatures until a test sample, upon cooling to room temperature, becomes solid or semi-solid. Then the hot oxidized oil is partially cooled to a temperature sufficiently low to permit the addition of volatile solvents, advantageously of the coal tar type, and a suitable amount of such a solvent is mixed with the partially cooled oil, thereby directly producing a solution of the oxidized oil. Cooling of the hot oil must be to a temperature below the boiling point of the solvent, but above that at which the oxidized oil solidifies. Viscous solutions may be easily prepared, having a high content of solids. In coating compositions, such as varnishes and the like, it is advantageous to have solutions of high solid content and such solutions are correspondingly viscous. The viscosity of the solution may be varied by controlling the amount of solvent added and the other factors.

In a specific embodiment of the present invention, linseed oil is air-blown at temperatures between 160 and 300° F. until a specific gravity of approximately 1.0 is attained. The oxidized oil is then cooled to a temperature of about 130° F. and benzol or other coal tar hydrocarbon is admixed therewith. The viscous solution thus produced does not solidify on further cooling. When exposed in the form of films or coatings, however, it very quickly dries and sets, giving an excellent protective film.

In my processes under the present invention, the oxidation is carried practically to the maximum extent; that is, an oil is made in which the iodine value is reduced to a minimum. This great reduction of the unsaturation of the oil appears to be mainly due to oxidation, although part of it may be due to polymerization. The solid matter left upon evaporating my viscous solution is an oxidized oil which is practically "dry". Formation of a film with it is primarily by the evaporation of solvent. Very little or none of the setting is by further oxidation of the oxidized oil in the film.

The following example is a typical embodiment of the present invention. The parts are given by weight. My invention is in no way restricted to the specific procedure set forth in this example; such procedure merely being a specific embodiment of my generic invention.

*Example*

In this example a linseed oil having the following properties was used:

| | |
|---|---|
| Saponification | 190 |
| Iodine value | 180 |
| Specific gravity | 0.932 |
| Acid value | from 0 to 5 |

About 1000 parts by weight of the above linseed oil were heated to about 180° F. and air-blown for approximately 5 hours, the temperature being maintained between 180° F. and 160° F. The treated oil was cooled to approximately 130° F. and mixed with 150 parts of benzol. The viscous solution obtained was an excellent coating composition.

A test sample withdrawn from the hot oil, upon cooling, became solidified. The solidified oil had the following properties:

| | |
|---|---|
| Saponification | 220 |
| Iodine value | 90 |
| Specific gravity | above 1 |
| Acid value | from 5 to 8 |

In place of benzol, other coal tar solvents, such as toluol and the like, may be used. Coal tar solvents, that is, aromatic solvents, are particularly advantageous. However, naphthas, gasoline and similar petroleum hydrocarbon solvents are also applicable. Although linseed oil, itself, is not soluble in alcohol, the oxidized oils are somewhat miscible with alcohol. For example, 15 to 25 per cent of grain alcohol can be mixed with the partially cooled oxidized oil to give desirable products. In general, I may use any appropriate organic liquid as a solvent.

The solution obtained by partially cooling the blown linseed oil and mixing with benzol is an excellent coating composition. Its content of solids is high and it quickly dries when applied to various surfaces, producing firm, set films in a remarkably short time. The admixture or solution of blown oil and benzol made as above described, when used as a varnish, gave a dry, set film in approximately an hour or less. Although the liquid composition quickly dries as a film, in bulk, it is quite stable. It does not gel or solidify or skin over when properly packaged.

While the blown oil thinned with benzol, etc., is an excellent coating composition, in and of itself, it is also a highly desirable material in compounding commercial paints and varnishes, using other materials. Various ingredients, such as solvents, diluents, thinners, fillers, resins, pigments, etc., commonly used in paints and varnishes, may be easily mixed and blended with these solutions to give various types of coating compositions.

My new coating compositions, when applied to various surfaces, quickly dry and readily set, giving an excellent firm film. Their drying properties are much superior to the known coating compositions of this type. For instance, the viscous solution of blown oil as prepared in the example gives a film which dries within an hour or less. With a coating composition prepared by dissolving a blown linseed oil having a gravity of 0.996 in an equal amount of benzol, the film requires from 15 to 20 hours to become fairly dry. This reduction in drying time is very advantageous.

My invention may be applied generically to any of the drying oils. In place of linseed oil, perilla, China wood, soya bean and other similar oils may be used. In the practice of my invention, the various factors may be varied to produce specific materials adapted to particular uses.

What I claim is:

1. As an improvement in the manufacture of oxidized fatty oil compositions in the form of thick liquids containing a volatile liquid as a thinner and useful in and as coating compositions such as varnishes and the like, the process which comprises heating a drying oil to a temperature between 160° and 180° F., blowing a current of air through the heated oil, so as to oxidize the oil, until upon cooling a sample to room temperature a solid product having a specific gravity of approximately 1.0 is obtained, discontinuing the air blowing at this time, partially cooling the blown oil to a temperature above its solidifying point, but below the boiling point of a volatile solvent to be added, adding such solvent and cooling the mixture.

2. In the manufacture of improved liquid oxidized linseed oil compositions, containing volatile solvent liquid, the process which comprises heating linseed oil to between 160° and 180° F., blowing a current of air through the heated oil, until a sample on complete cooling gives a solid oxidized oil of approximately specific gravity 1.0, discontinuing the air blowing, cooling to about 130° F., adding approximately 15 per cent of benzol and completing the cooling.

3. As an improvement in the manufacture of oxidized linseed oil compositions in the form of thick liquid containing a volatile liquid as a thinner and useful in and as coating compositions such as varnishes and the like, the improvement which comprises heating linseed oil to a temperature between 160° and 300° F., blowing a current of air through the heated oil so as to oxidize the oil, until upon cooling a sample to room temperature, a solid product insoluble in volatile coal tar solvents and having a specific gravity of approximately 1.0 and an iodin value of 90 is obtained, discontinuing the air-blowing at that stage, partially cooling the air-blown oxidized oil to a temperature of about 130° F., adding between 15 and 25 per cent of a volatile coal tar solvent to the partially cooled oil and completing the cooling, thus producing a highly concentrated solution of said oxidized linseed oil in said solvent.

ALEXANDER SCHWARCMAN.